United States Patent [19]
Curello et al.

[11] Patent Number: 5,594,939
[45] Date of Patent: Jan. 14, 1997

[54] SYNTHESIZER ROUTING ARCHITECTURE FOR A SWITCHING APPARATUS

[75] Inventors: Charles C. Curello, Torrance; I. Mark Shahriary, Santa Monica; Arnold L. Berman, Los Angeles, all of Calif.

[73] Assignee: Hughes Aircraft Company, Los Angeles, Calif.

[21] Appl. No.: 979,952

[22] Filed: Nov. 23, 1992

[51] Int. Cl.⁶ .................................................. H04B 7/14
[52] U.S. Cl. .......................... 455/12.1; 455/20; 455/103
[58] Field of Search ............................ 455/216, 78, 103, 455/132, 146, 189.1, 209, 8, 12.1, 13.3, 20; 375/5, 15; 379/15, 14, 13; 370/69.1, 76

[56] References Cited

U.S. PATENT DOCUMENTS

| | | | |
|---|---|---|---|
| 4,367,558 | 1/1983 | Gercekci et al. | 455/182.1 |
| 4,852,086 | 7/1989 | Eastmond et al. | 375/5 |
| 5,287,543 | 2/1994 | Wolkstein | 455/103 |

Primary Examiner—Andrew Faile

[57] ABSTRACT

A satellite switching network disposed to operate with relatively few redundant components. The high-frequency switching network with improved routing architecture (10) of the present invention is operative to convert input signals received over a plurality of receive channels into output signals to be carried by a plurality of transmit channels. An arrangement of receiver networks 104, 106, 108 and 110 converts the input signals to a plurality of intermediate frequency (I.F.) signals. The I.F. signals are routed to a set of synthesized downlink transmitter networks 186, 190, 192, 194 by a switch matrix 126. Each synthesized downlink transmitter generates signal energy over a set of downlink channels in response to the I.F. signals supplied thereto.

19 Claims, 10 Drawing Sheets

SYNTHESIZER ROUTING ARCHITECTURE FOR A SWITCHING APPARATUS

BACKGROUND OF THE INVENTION

1. Field of the Invention

This invention relates to electronic switching systems. More specifically, this invention relates to switching arrangements disposed to effectuate frequency conversion of the signal energy passing therethrough.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Satellite communication systems are increasingly used to facilitate signal transmission between geographically diffuse groups of users. In many such systems, a high-frequency switching network deployed on a satellite receives signal information from earth stations over a plurality of uplink frequency bands. Many conventional switching networks are designed to receive signal energy from uplink channels dispersed throughout spectral bands included within the microwave and millimeter wave frequency regions. Commonly used uplink bands include those spanning 5.9 to 6.4 GHz (C-band), 14 to 14.5 GHz (Ku-band), and 27 to 27.5 GHz (Ka-band). Similarly, signal energy is generally broadcast by the satellite over downlink bands extending from 3.7 to 4.2 GHz (C-band), 11.7 to 12.2 GHz (Ku-band), and 18 to 18.5 GHz (Ka-band).

Ideally, a satellite-based switching network would be able to convert the frequency of signal information received over any uplink channel to a desired downlink channel. In conventional switching arrangements each uplink channel generally includes a downconverter dedicated to translating the frequency of the received signal energy down to a single predefined intermediate frequency (I.F.). The I.F. signals are then routed by a switch matrix to an array of frequency upconverters. Specifically, each downlink channel utilizes one of the upconverters to translate the frequency of I.F. signal energy from the switch matrix up to RF (radio frequency) as a downlink signal.

Unfortunately, in order to safeguard against system failure a redundant component generally needs to be provided for each unique electronic element employed on the satellite. Since in conventional switching networks each frequency conversion element is unique (i.e. tuned to a single frequency), back-up upconverters and downconverters are generally respectively required for the receive and transmit channels. The large number of redundant devices in existing switching schemes increases system cost and complexity. Moreover, since weight minimization is typically a priority in the design of satellite communication systems this redundancy requirement may reduce the number of available channels.

Accordingly, a need in the art exists for a lightweight switching network suitable for use in a satellite communications system.

SUMMARY OF THE INVENTION

The need in the art for a satellite switching network disposed to operate with relatively few redundant components is addressed by the improved routing architecture of the present invention which is applicable for use in switching networks. The inventive routing architecture is able to convert input signals received over a plurality of receive channels into output signals to be carried by a plurality of transmit channels. An arrangement of receiver networks converts the input signals to a plurality of intermediate frequency (I.F.) signals. The I.F. signals are routed to a set of synthesized downlink transmitter networks by a switch matrix. Each synthesized downlink transmitter generates signal energy over a set of downlink channels in response to the I.F. signals supplied thereto.

DETAILED DESCRIPTION OF THE INVENTION

Figure 1:
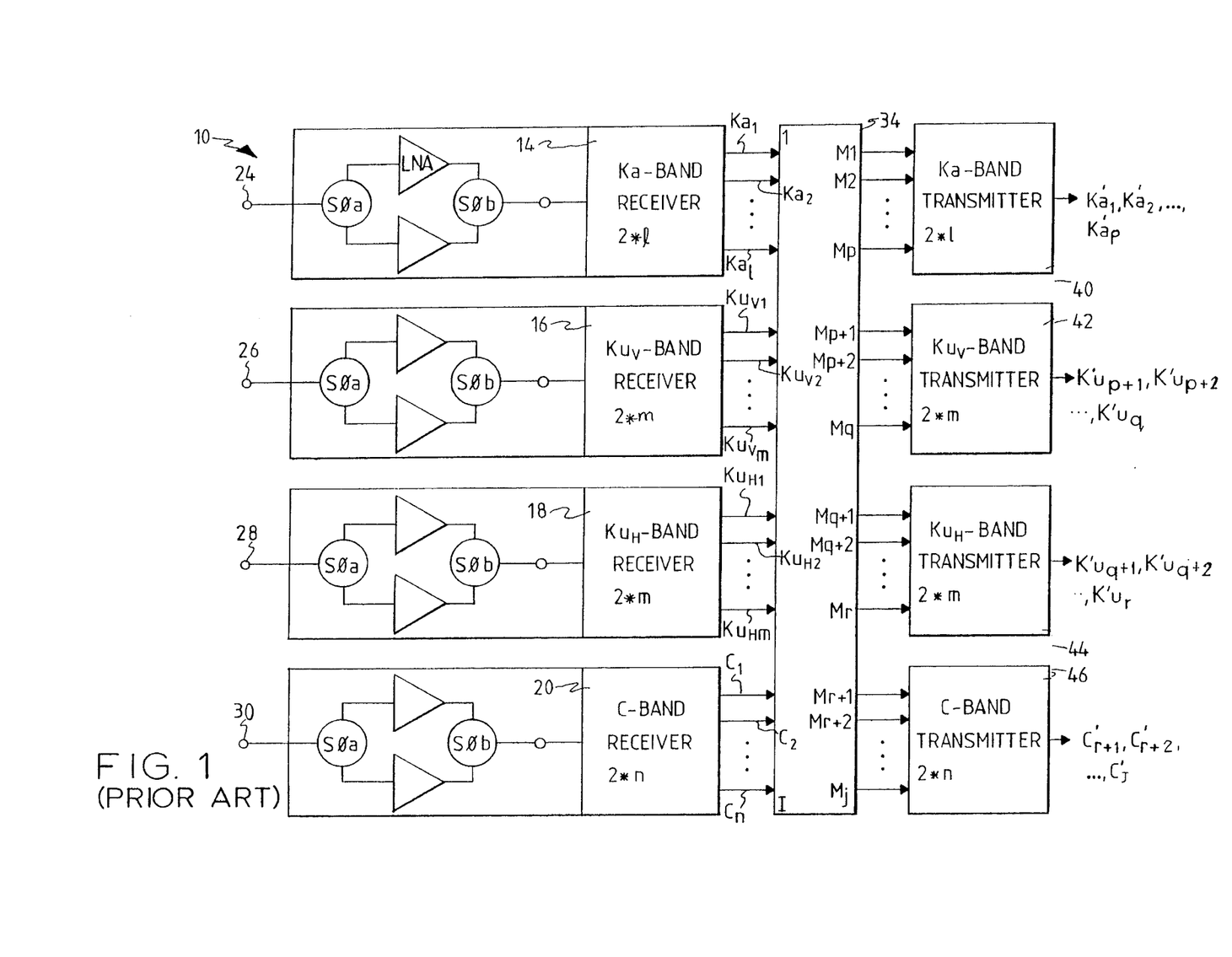
FIG. 1 shows a block diagram of a conventional high-frequency signal switching network.

FIG. 1 shows a block diagram of a conventional high-frequency signal switching network 10. The network 10 may be deployed on a satellite, for example, in order to provide a set of communication paths between widely separated transmit and receive stations. The conventional network 10 includes first, second, third and fourth receivers 14, 16, 18 and 20 operative to receive Ka-band, vertically-polarized Ku-band, horizontally-polarized Ku-band and vertically-polarized C-band signal energy, respectively. The signal energy supplied to the receivers 14, 16, 18 and 20 is collected by an antenna array (not shown) and impressed on first, second, third and fourth receiver input terminals 24, 26, 28 and 30.

Each of the receivers includes a set of frequency downconverters (not shown in FIG. 1) for dividing signal energy within one of the uplink frequency bands into a plurality of channels. For example, energy impressed upon input terminal 24 is downconverted to a single intermediate frequency (I.F.) and multiplexed onto the Ka-band channels $Ka_1$, $Ka_2$, . . . , $Ka_l$. Similarly, electromagnetic energy within the vertically-polarized Ku-band, horizontally-polarized Ku-band, and C-band frequency ranges is segregated into channels $Ku_{v1}$ through $Ku_{vm}$, $Ku_{h1}$ through $Ku_{hm}$, and $C_1$ through $C_n$, respectively. In the conventional network 10 each of these channels is operated at a single intermediate frequency (I.F.) included within a frequency range acceptable to an I×J switch matrix 34. The switch matrix 34 includes a plurality (I) of input ports, with I being equal to the number of channels provided by the receivers 12, 14, 16 and 18. Similarly, the matrix 34 includes J output ports for providing the signal energy carried by the J downlink channels of the conventional network 10.

Referring again to FIG. 1, the conventional switching network 10 includes first, second, third and fourth downlink transmitter networks 40, 42, 44 and 46. Each of the transmitter networks includes a plurality of frequency upconverters for translating the I.F. signal energy from the switch matrix 34 into separate downlink channels. For example, the first transmitter network 40 operates to convert I.F. signal energy from switch matrix output ports $M_1, M_2, \ldots, M_p$ into downlink channels $Ka_1', Ka_2', \ldots, Ka_p'$, respectively. Each of the downlink channels $Ka_1', Ka_2', \ldots, Ka_p'$ spans a predefined spectrum within the Ka-band frequency range and is provided to a single Ka-band transmit antenna (not shown). In a similar manner the matrix output ports $M_{p+1}$ through $M_J$ feed the second, third, and fourth transmitter networks 42, 44 and 46. In response, the networks 42, 44 and 46 respectively provide downlink channels $Ku_{p+1}'$ through $Ku_q'$, $Ku_{q+1}'$ through $Ku_r'$, and $C_{r+1}'$ through $C_J'$.

Figure 2:
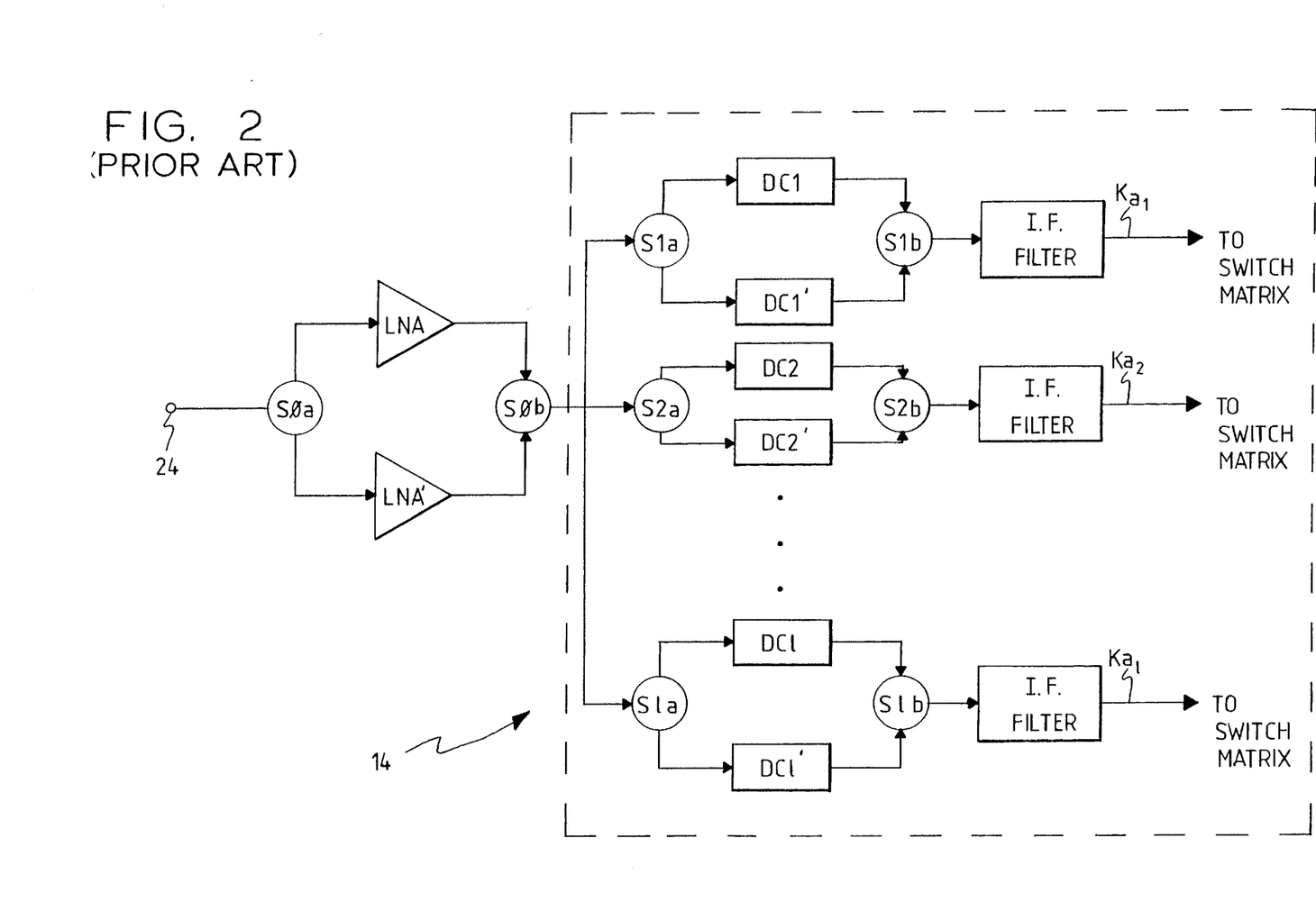
FIG. 2 shows a more detailed block diagram of a first receiver included within the conventional signal switching network.

FIG. 2 shows a more detailed block diagram of the first receiver 14. The first receiver 12 includes a primary low-noise amplifier (LNA) and a redundant low-noise amplifier (LNA'). First and second input switches S0a and S0b are set such that signal energy impressed on input terminal 24 is nominally amplified by the primary LNA and provided to downconverter input switches S1a, S2a, ... S1a. In the case of failure of the primary LNA the switches S0a and S0b may be reconfigured such that the redundant low-noise amplifier becomes operatively coupled to input terminal 24 and to switches S1a through S1a.

Referring to FIG. 2, the switches S1a, S2a, ..., S1a nominally route signal energy from the second input switch S0b to first through $1^{th}$ primary downconverters DC1, DC2, ..., DC1. Again, the downconverter input switches S1a, S2a, ..., S1a may be reset upon failure of one of the primary downconverters such that the appropriate one of redundant downconverters DC1', DC2', ..., DC1' becomes operatively connected to the second input switch S0b. Each redundant downconverter is generally identical to the primary downconverter for which it may be substituted. The primary downconverters DC1, DC2, ..., DC1 are of conventional design and are operative to translate the frequencies of discrete uplink channels within the Ka frequency band to the I.F. frequency. Downconverter output switches S1b, S2b, ... . S1b connect the output of the selected primary or redundant downconverter to a filter centered about the I.F. frequency. In this manner, the signal information carried by uplink channels $Ka_1, Ka_2, \ldots, Ka_1$ is supplied at the intermediate frequency to first through $1^{th}$ input ports of the switch matrix 34.

FIG. 2 highlights several of the disadvantages inherent within conventional demultiplexing receiver networks. For example, as previously noted, each channel within the incident Ka uplink band is translated to the same intermediate frequency. It follows that each of the primary downconverters DC1, DC2, ..., DC1 includes a uniquely tuned local oscillator. Thus, a redundant downconverter must be separately provided for each channel to ensure continued channel operation following failure of one of the primary downconverters. As noted in the Background of the Invention, this duplication increases the weight and cost of the conventional switching network 10.

Figure 3:
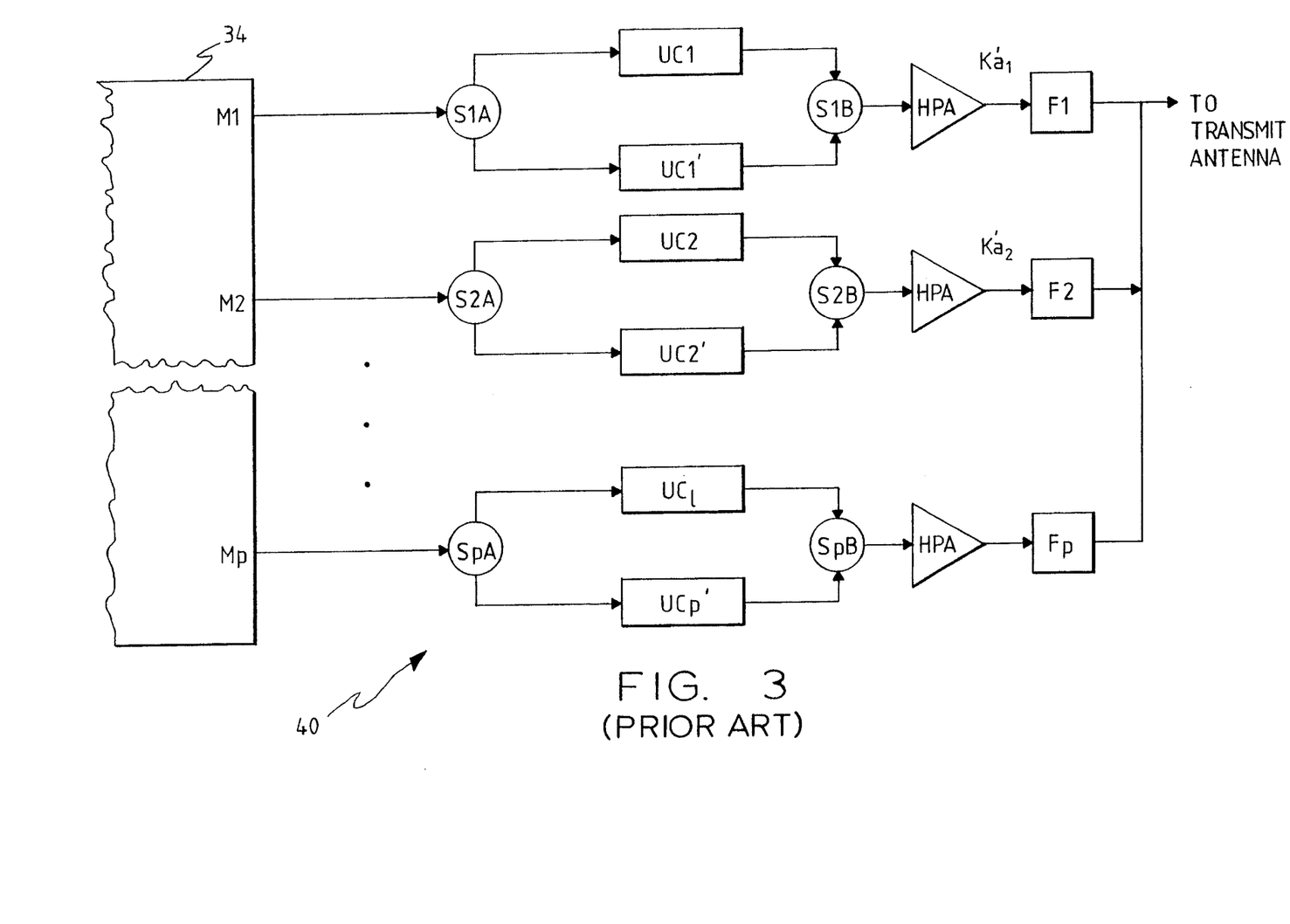
FIG. 3 is a more detailed block diagram of a first conventional downlink transmitter network.

FIG. 3 is a more detailed block diagram of the first downlink transmitter network 40 of the conventional system. The transmitter network 40 is operatively connected to the matrix output ports M1, M2, ..., Mp through transmitter input switches S1A, S2A, ..., SpA. The switch matrix 34 includes an interconnection array (not shown) for transmitting one uplink channel to each of the output ports M1, M2, ..., Mp. The switches S1A, S2A, ..., SpA thus each provide an uplink signal at the intermediate frequency (I.F.) to first, second, ..., $p^{th}$ primary upconverters UC1, UC2, ..., UCp. Each of the primary upconverters is designed to translate signal energy at the intermediate frequency up to a Ka-band downlink channel. It follows that each upconverter must be provided with a separate local oscillator (L.O.) frequency in order to avoid overlap among the downlink channels.

Again, the switches S1A, S2A, ... SpA may be reset in order to route signal energy from the matrix output ports M1, M2, ..., Mp to redundant upconverters UC1', UC2', ..., UCp' in the event of a failure within a primary upconverter. Similarly, upconverter output switches S1B, S2B, ..., SpB are nominally configured to operatively connect the primary upconverters UC1, UC2, ..., UCp to first, second, ..., $p^{th}$ multiplexing filters F1, F2, ..., Fp. The multiplexing filters F1, F2, ..., Fp include passbands centered about the Ka-band downlink channels $Ka_1', Ka_2', \ldots, Ka_p'$, respectively. In this manner the downlink channels within the Ka-band are frequency-multiplexed prior to being sent to a Ka-band transmit antenna (not shown). It is apparent from FIG. 3 that each primary upconverter operates at a unique L.O. frequency, and hence requires a separate redundant local oscillator element. Again, such 1:1 duplication increases the cost and complexity of conventional transmitter networks.

Figure 4:
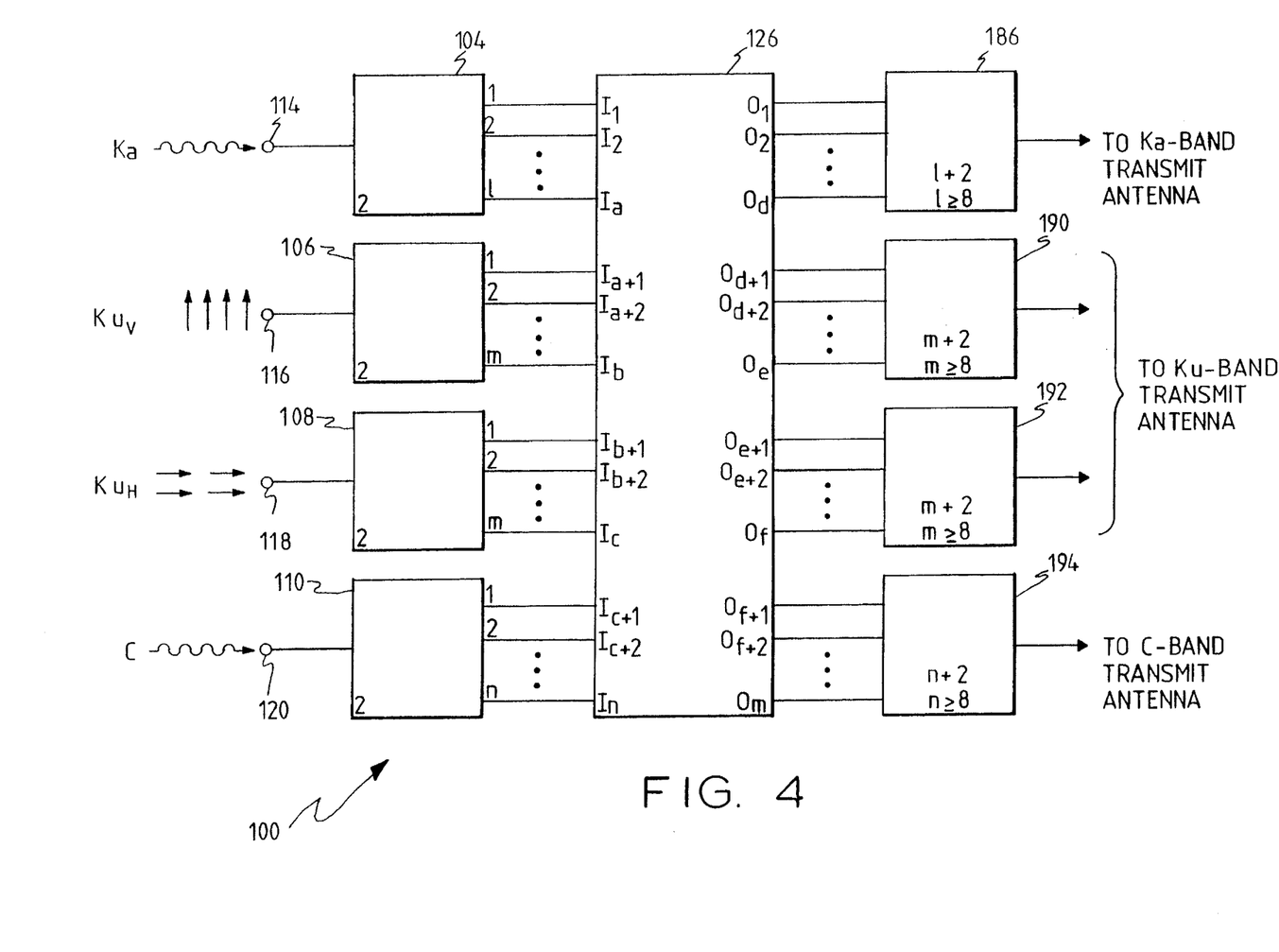
FIG. 4 shows a block diagram of a preferred embodiment of a switching network utilizing the improved routing architecture of the present invention.

FIG. 4 shows a block diagram of a preferred embodiment of the switching network 100 using the improved routing architecture of the present invention. The improved switching network 100 includes first, second, third and fourth uplink receiver networks 104, 106, 108 and 110 operative to receive Ka-band, vertically-polarized Ku-band, horizontally-polarized Ku-band and C-band signal energy, respectively. The signal energy supplied to the uplink receivers 104, 106, 108 and 110 is collected by an antenna array (not shown) and impressed on first, second, third and fourth uplink terminals 114, 116, 118 and 120.

As is described more fully below, the uplink receivers 104, 106, 108 and 110 are operative to convert uplink channels within the Ka, Ku (horizontal), Ku (vertical) and C frequency bands, respectively, into a set of channels spanning a range of intermediate frequencies (I.F.'s). Referring to FIG. 4, the I.F. signals generated by the first receiver network 104 are provided to input ports $I_1, I_2, \ldots, I_a$ of an N×M switch matrix 126. Similarly, the I.F. signals produced by the second, third and fourth receiver networks 106, 108 and 110 are impressed as indicated on input ports $I_{a+1}$ through $I_N$.

Figure 5:
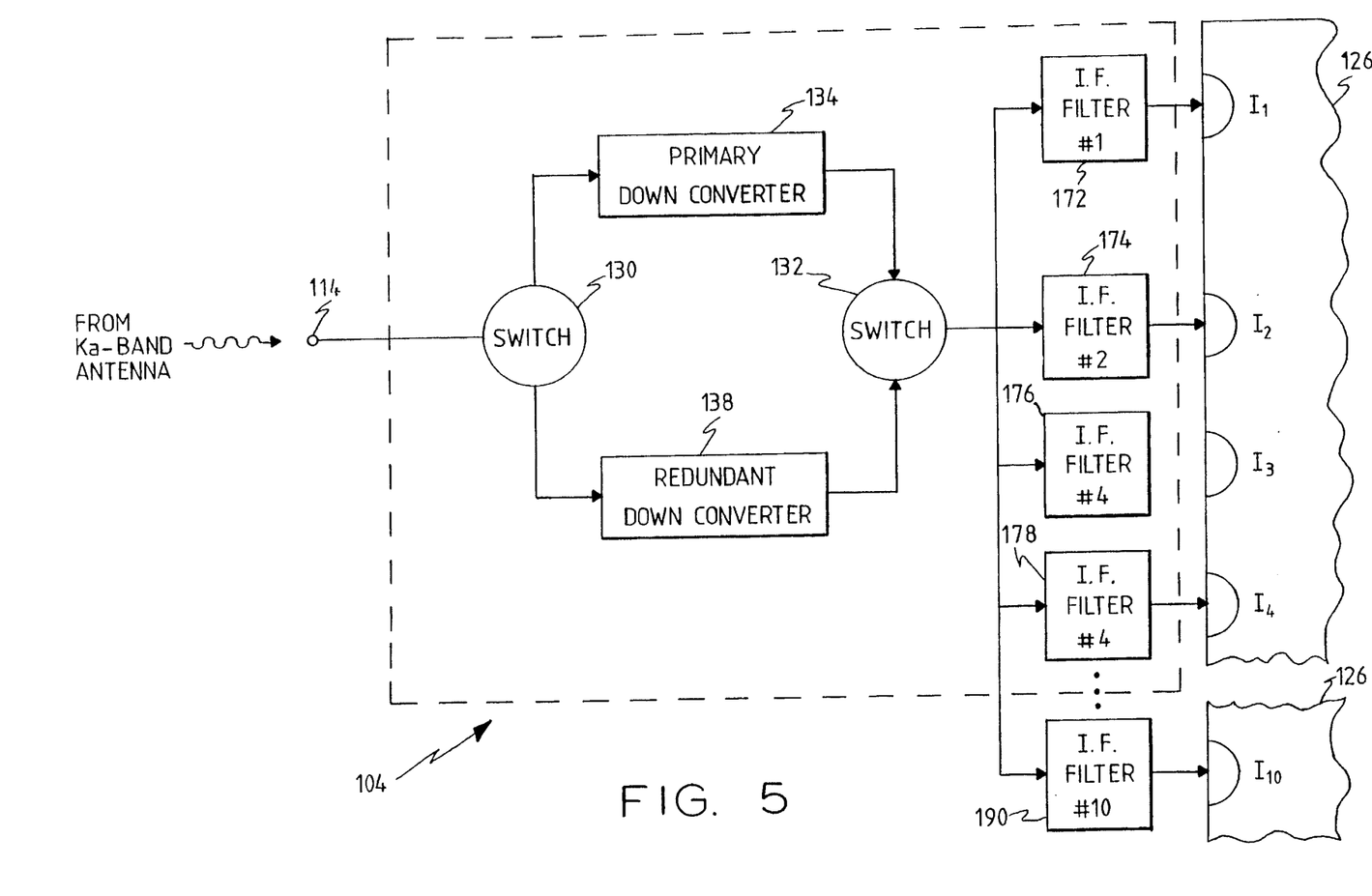
FIG. 5 shows a more detailed block diagram of a first uplink receiver network included within the inventive switching network.

FIG. 5 shows a more detailed block diagram of the first uplink receiver network 104. Again, signal energy from a set of Ka-band uplink channels is incident on the first uplink terminal 114. The Ka uplink band may be divided into a desired number of channels extending from 27 to 27.5 GHz. For example, in the presently preferred embodiment, a portion of the Ka-band is equally divided into first through tenth channels respectively extending from 27.0 to 27.05, 27.05 to 27.1, . . . , and 27.45 to 27.5 GHz. Allocation of the Ka-band uplink spectrum in this manner results in the first network 104 being operative to translate the first through tenth Ka-band uplink channels to first through tenth I.F. channels, respectively. The network 104 may be designed such that the first through tenth I.F. channels encompass, for example, the 1.0 to 1.5 GHz frequency spectrum. Thus, the first through tenth I.F. channels will respectively extend from 1.0 to 1.05 GHz, 1.05 to 1.1 GHz, . . . , and 1.45 to 1.5 GHz, and will be routed to the first through tenth input ports $I_1$ through $I_{10}$ of the switch matrix 126.

Referring to FIG. 5, the first uplink terminal 114 is coupled to a first receiver switch 130. The first switch 130 and a second receiver switch 132 may be implemented using a standard millimeter-wave three-port switching element available, for example, from Phillips of Australia as part number 7714711. The switches 130 and 132 will nominally be set to guide energy from the uplink terminal 114 to a primary Ka-band downconverter 134. In the event the primary downconverter 134 becomes inoperative the switch 130 is reset to place a substantially identical redundant downconverter 138 in communication with the first uplink terminal 114.

Figure 6:
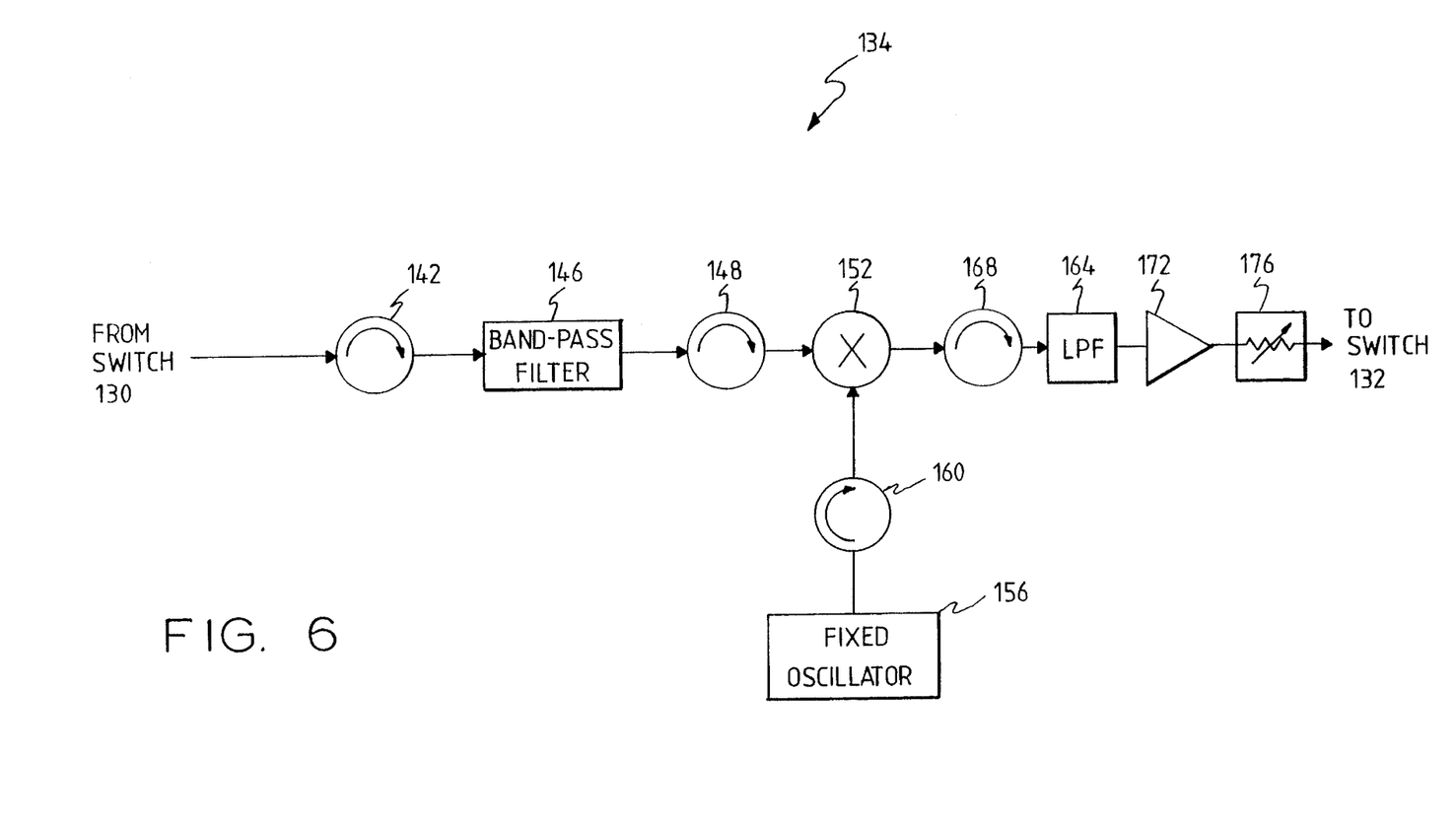
FIG. 6 illustrates one manner in which a primary downconverter included within the present invention may be conventionally implemented.

FIG. 6 illustrates one manner in which the primary downconverter 134 may be implemented. The downconverter 134 includes a first input isolator 142 for buffering switch 130 from a bandpass filter 146. The filter 146 is designed to reject signal energy not within the utilized portion of the Ka-band frequency spectrum (i.e. 27 to 27.5 GHz). A second input isolator 148 is interposed between the bandpass filter 146 and a three-port mixer 152. The mixer 152 receives Ka-band signal energy from the filter 146, and includes a reference port driven by an L.O. signal. The L.O. signal is supplied to the mixer 152 by an oscillator 156 coupled thereto via a reference isolator 160. The frequency of the oscillator 156 is selected such that the Ka-band uplink channels are translated to the desired range of intermediate frequencies. For example, assuming an I.F. range of 1.0 to 1.5 GHz the L.O. signal will be set at 26.0 GHz. The mixer 152 provides the frequency-translated uplink channels to a first low-pass filter 164. The low-pass filter 164 is coupled to the mixer 152 via a first output isolator 168, and has a passband centered within the I.F. spectral range. An amplifier 172 and variable attenuator 176 operatively couple the first low-pass filter 164 to the second receiver switch 132.

Referring to FIG. 5, the frequency-translated uplink channels incorporated within the I.F. waveform provided by the second receiver switch 132 are demultiplexed by first through tenth I.F. output filters 172, 174, 176, 178, 180, 182, 184, 186, 188, and 190. Specifically, in the presently preferred embodiment the first I.F. output filter 172 has a passband extending from 1.0 to 1.05 GHz. Similarly, the second through tenth I.F. filters span equal 0.05 GHz frequency intervals between 1.05 GHz and 1.5 GHz. In this manner the first receiver network 104 supplies the information carried by the first through tenth Ka-band uplink channels to the first through tenth matrix input ports $I_1$ through $I_{10}$.

The second, third and fourth receiver networks 106, 108 and 110 have network topologies substantially identical to that of the first network 104. For example, Ku-band downconverters within the second and third networks 106 and 108 operate to translate the incident vertically and horizontally polarized Ku-band signal energy (FIG. 4) to the desired I.F. spectral range (1.0 to 1.5 GHz). Again, the bandwidth occupied by each I.F. channel created by the networks 106 and 108 depends on the number of channels within the vertically-polarized Ku-band frequency spectrum. For example, if ten Ku-band uplink channels are utilized each would encompass one-tenth of the selected I.F. range. In the presently preferred embodiment each Ku-band downconverter will include an 11 GHz oscillator to enable incident Ku-band signal energy (14.0 to 14.5 GHz) to be mixed down to the 1.0 to 1.5 GHz I.F. range. Similarly, a mixer included within the fourth receiver network 110 is driven by a 4.9 GHz oscillator such that channels included within the C-band uplink frequency range (5.9 to 6.4 GHz) are mapped to 1.0 to 1.5 GHz.

As is evident from inspection of FIG. 5, the receiver networks 104, 106, 108 and 110 of the present invention need fewer unique active elements than are conventionally required (as shown in FIG. 2). This feature results from the operation of each of the inventive receiver networks to convert aggregate blocks of uplink channels to the selected I.F. range rather than to effect frequency conversion of individual uplink channels. Consequently, each of the inventive receivers need only employ a single primary downconverter having an input bandwidth encompassing the uplink band of interest.

Figure 7:
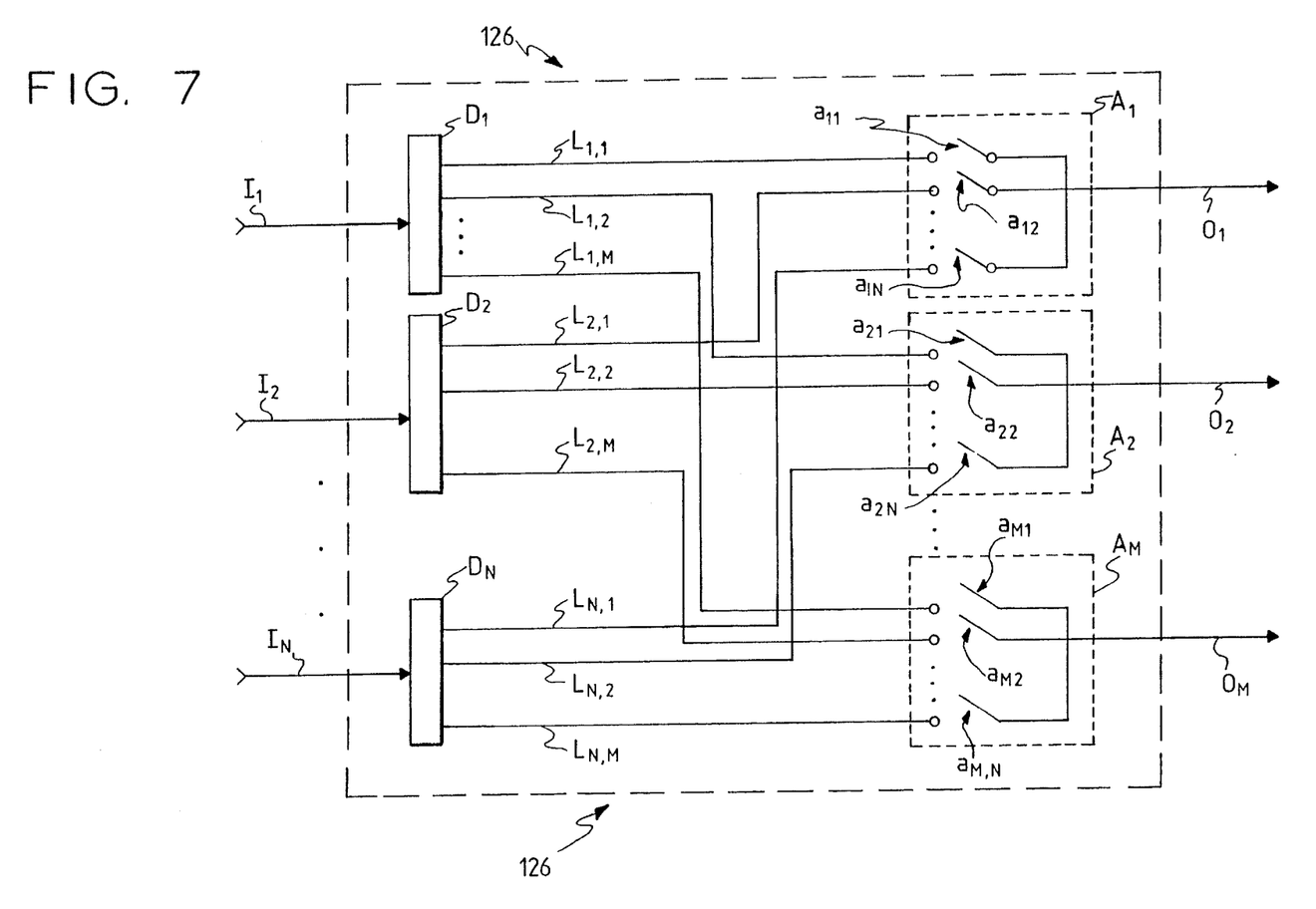
FIG. 7 illustrates a typical N×M high-frequency switch matrix.

FIG. 7 shows an illustrative representation of the N×M switch matrix 126. Again, the switch matrix 126 includes input ports $I_1$ through $I_N$ operatively coupled to the receiver networks 104, 106, 108 and 110. Signal energy incident on the first through Nth input ports $I_1, I_2, \ldots, I_N$, is then routed to a plurality of interconnection lines by first through Nth power dividers $D_1, D_2, \ldots, D_N$. Specifically, the first power divider $D_1$ divides energy received by the first input port $I_1$ equally among interconnection lines $L_{1,1}, L_{1,2}, \ldots, L_{1,M}$. The power dividers $D_1$ through $D_N$ are available from, for example, Hughes Aircraft Company of El Segundo, Calif., Part No. 6033300. Each of the power dividers is chosen to have an input bandwidth encompassing the uplink frequency range incident on the input port to which it is connected. The interconnection lines $L_{1,1}, L_{1,2}, \ldots, L_{1,M}$ respectively address first through Mth output switch arrays $A_1, A_2, \ldots, A_M$. As is indicated in FIG. 7, the switch arrays $A_1, A_2, \ldots, A_M$ are addressed in a similar manner by interconnection lines $L_{2,1}, L_{2,2}, \ldots, L_{2,M}$ from the second power divider $D_2$, and by interconnection lines $L_{N,1}, L_{N,2}, \ldots, L_{N,M}$ coupled to the power divider $D_N$. The interconnection lines may be conventionally realized from high-frequency transmission media such as waveguide, stripline or microstrip.

Referring to FIG. 7, N×1 switches a11, a12, . . . , a1N within the first switch array $A_1$ may be opened or closed as required to place a first output port $O_1$ of the switch matrix 126 in communication with one of the input ports $I_1, I_2, \ldots, I_N$. The positions of N×1 switches a21 through aMN within the arrays $A_1, A_2, \ldots, A_M$ will be similarly chosen to operatively connect switch matrix output ports $O_2$ through $O_M$ with a selected matrix input port. The switch arrays $A_1, A_2, \ldots, A_M$ may be fabricated from, for example, switches manufactured by Hughes Aircraft Company of El Segundo, Calif., part number 3837635.

As shown in FIG. 4, the output ports $O_1$ through $O_M$ of the switch matrix 126 address first, second, third and fourth synthesized downlink transmitters 186, 190, 192 and 194. The first downlink transmitter 186 operates to convert the I.F. signal information supplied by the output ports $O_1, O_2, \ldots, O_d$ to a plurality (i.e. "d") of downlink channels within the Ka-band spectral range. In like manner the second and third synthesized transmitters 190 and 192 are disposed to respectively generate vertically and horizontally polarized Ku-band downlink channels in response to the uplink signal information provided to the matrix output ports $O_{d+1}$ through $O_e$, and $O_{e+1}$ through $O_f$. The fourth synthesized transmitter 194 is operative to translate the I.F. signals delivered by the output ports $O_{f+1}$ through $O_M$ into a set of C-band downlink channels.

The first and fourth synthesized transmitters 186 and 194 will generally be connected to Ka-band and C-band transmit antennas (not shown), respectively. Similarly, the Ku-band downlink channels generated by the second and third synthesized transmitters 190 and 192 are forwarded to vertically and horizontally-polarized Ku-band transmit antennas.

Figure 8:
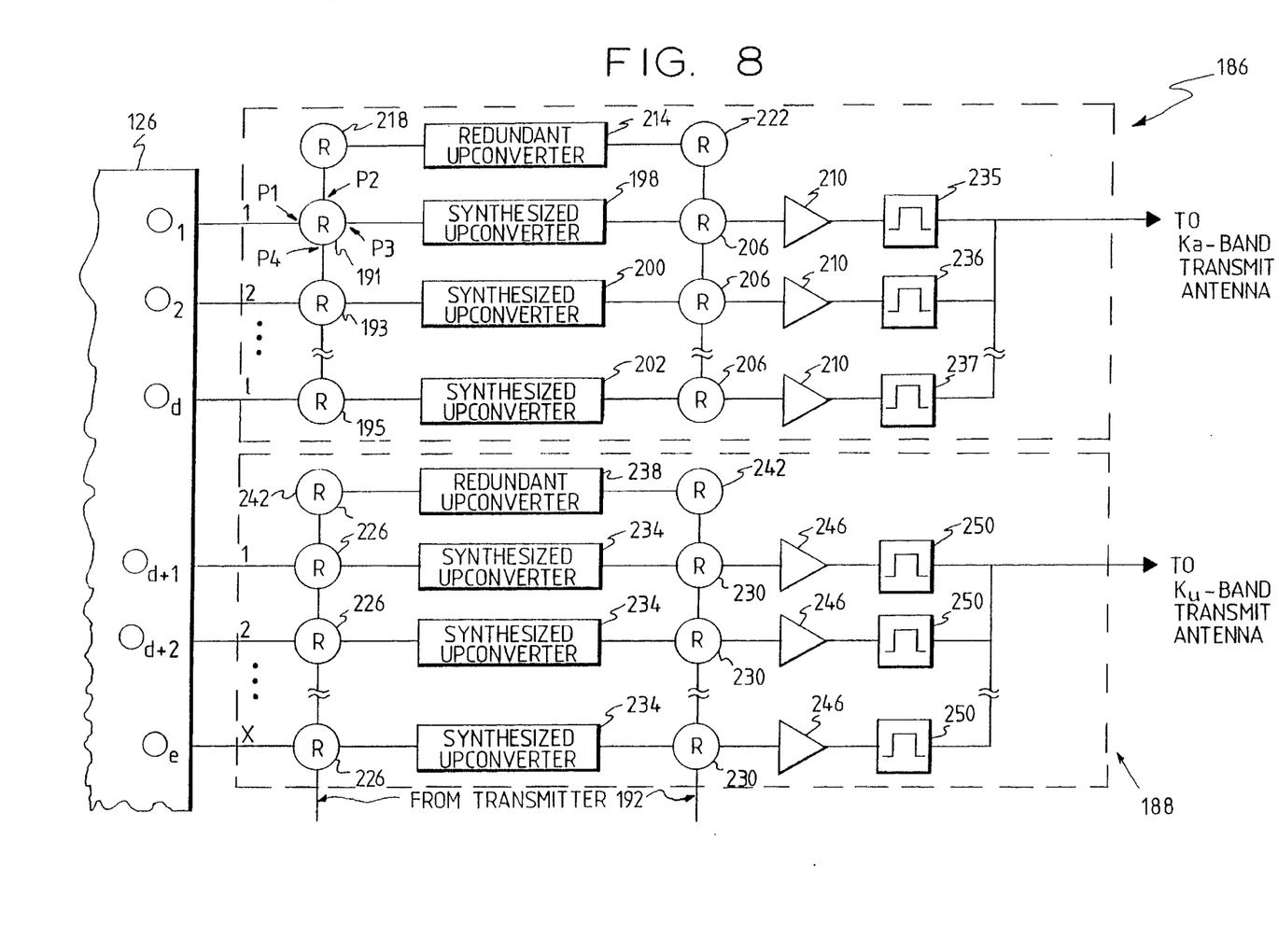
FIG. 8 shows a block diagram of a first (Ka-Band) and a second (Ku-Band) synthesized downlink transmitter.

FIG. 8 shows a block diagram of the first and second synthesized downlink transmitters 186 and 190. The first synthesized downlink transmitter 186 is coupled to the switch matrix output ports $O_1, O_2, \ldots, O_d$ through first, second and $d^{th}$ input R-switches 191, 193 and 195. Each of the R-switches is a four-port device capable of being placed in first, second or third switching orientations. For example, when set in the first switching orientation the first R-switch 191 operates to guide energy incident on a first port P1 to a third port P3. When disposed in the second switching orientation the switch 191 conducts energy from the first port P1 to the fourth port P4, and from the second port P2 to the third port P3. In the third switching orientation energy propagates from port P1 to port P2, and from port P4 to port P3. The R-switches described herein may be implemented using four-port switches manufactured by, for example, the Hughes Aircraft Company as Part #7714711-1.

Referring to FIG. 8, the first, second and $d^{th}$ input R-switches 191, 193 and 195 will nominally be set in the first orientation in order to operatively connect the matrix output ports $O_1, O_2, \ldots, O_d$ with first, second, ..., and $d^{th}$ synthesized Ka-band upconverters 198, 200 and 202. In like manner output R-switches 206 will typically be placed in the first orientation in order to couple the synthesized upconverters 198, 200 and 202 to output amplifiers 210. However, in the event that one of the Ka-band upconverters becomes inoperative the R-switches may be reset to route signal energy to a redundant synthesized Ka-band upconverter 214. For example, the redundant upconverter 214 may be utilized to operate in lieu of the first synthesized upconverter 198 by placing the first input switch 190 in the third orientation, an input redundant switch 218 in the third orientation, and an output redundant switch 222 in the second orientation. The output R-switch 206 coupled to the redundant switch 222 would also be configured in the second orientation, while the remaining R-switches within the transmitter 186 would remain in the first orientation.

The R-switches may be reset in a similar manner to divert signal energy from, for example, the second synthesized upconverter 200. In particular, input R-switches 191 and 193 would be reset from the first to the third orientation, while the output R-switches nominally coupled to upconverters 198 and 200 would be placed in the second orientation. In this manner I.F. signal energy from output ports $O_1$ and $O_2$ would be respectively routed to the redundant upconverter 214 and to the first Ka-band upconverter 198. Hence, the R-switches within the first downlink transmitter 186 may be positioned such that the redundant upconverter 214 becomes active in the event of failure of any of the remaining synthesized Ka-band upconverters. In alternatively preferred embodiments of the present invention an additional redundant downconverter (not shown) may be connected between the $d^{th}$ input R-switch 195 and the output R-switch 206 nominally coupled to the $d^{th}$ synthesized upconverter 202. It is thus a feature of the present invention that a one-for-one redundant upconverter is not required to be provided for each downlink channel. As was discussed in the Background of the Invention, conventional downlink transmitter networks generally require that a uniquely-tuned redundant upconverter be provided for each primary upconverter.

The minimal redundancy inherent within the first transmitter network 186 is facilitated by designing each of the synthesized upconverters to be interchangeable. As will be described in more detail with reference to FIG. 9, each of the upconverters within the network 186 includes a local oscillator which may be adjusted in frequency over an identical range. In this manner any upconverter within the network 186 may be tuned to translate any of the I.F. signals from matrix ports $O_1$ through $O_d$ into a particular Ka-band downlink channel. Referring to FIG. 8, the first synthesized upconverter 198 is initially tuned such that the frequency of the signal energy emerging from matrix port $O_1$ is converted to the frequency of a first Ka-band downlink channel. The signal energy included within the first downlink channel is then passed through a first Ka-band output filter 223 operatively coupled to a Ka-band transmit antenna (not shown). Similarly, second and $d^{th}$ Ka-band output filters 235, 236 and 237 are tuned to pass energy within second and $d^{th}$ Ka-band downlink channels, respectively.

Again referring to FIG. 8, the second Ku-band downlink transmitter network 190 operates in a manner substantially similar to that of the first network 186. Again, a second set of input R-switches 226 and a second set of output R-switches 230 will nominally be configured in the first switch orientation described above. In the case of failure of one of a set of identical Ku-band synthesized upconverters 234 the R-switches may be reset to route the I.F. signal from matrix output port $O_{d+1}$ to a Ku-band redundant upconverter 238. The redundant upconverter 238 is linked to the R-switches 226 and 230 by redundant R-switches 242. The second downlink transmitter network 190 further includes a set of Ku-band output amplifiers 246 connected to the Ku-band output R-switches 230. The signal energy from the amplifiers 246 is frequency-multiplexed by a set of Ku-band output filters 250 prior to being projected by a Ku-band transmit antenna (not shown). Each of the Ku-band filters 250 includes a passband encompassing a downlink channel within the Ku-band spectral range. As was discussed above with reference to the first transmitter network 186, each of the Ku-band synthesized upconverters may be tuned as necessary to convert any signal within the selected I.F. range into a Ku-band downlink channel. The third and fourth synthesized downlink transmitters (not shown in FIG. 8) operate in the presently described manner to respectively generate the vertically-polarized Ku-band and C-band downlink channels.

Figure 9:
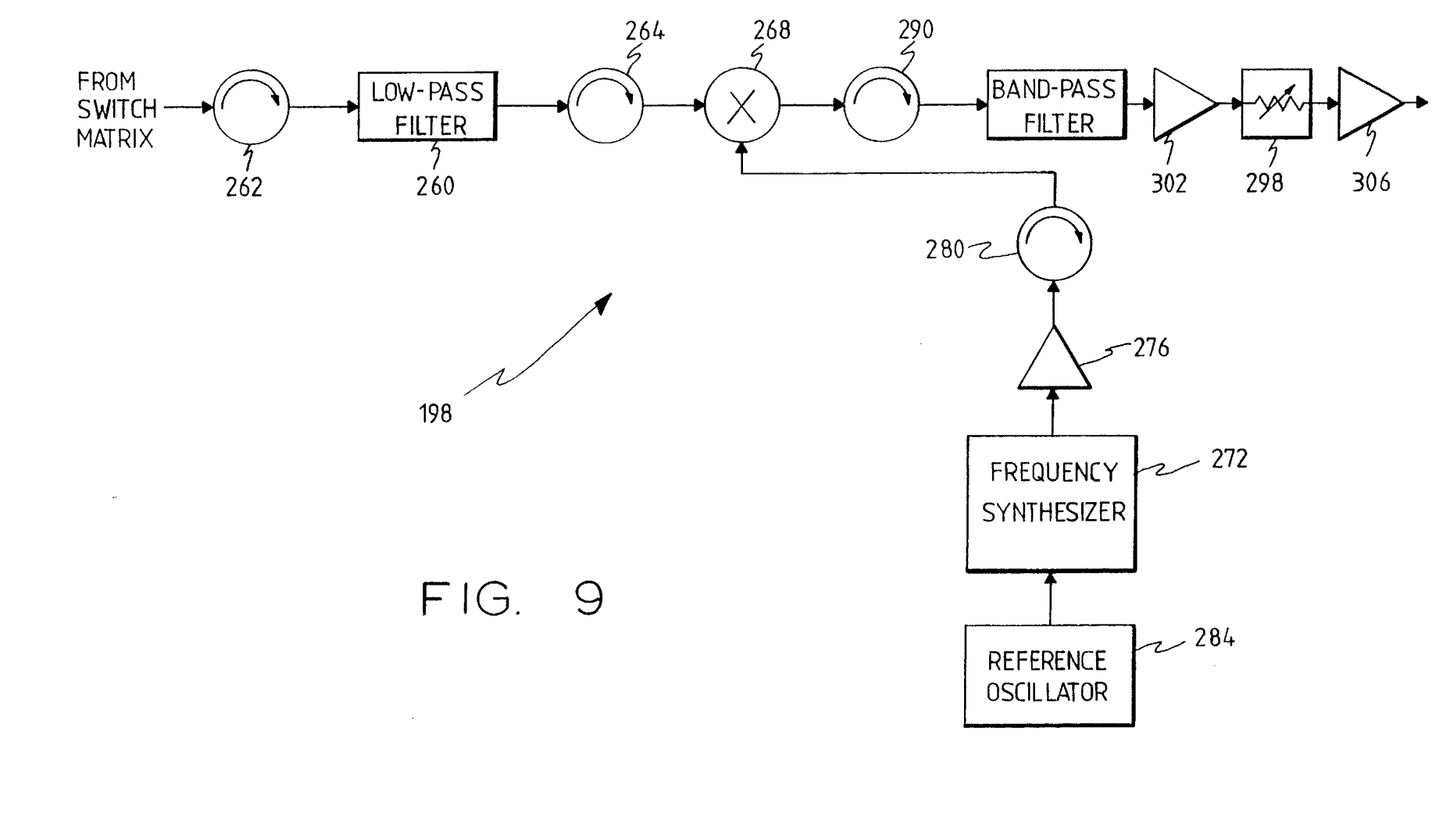
FIG. 9 illustrates a preferred implementation of a first Ka-band synthesized upconverter included within the first synthesized downlink transmitter.

FIG. 9 illustrates a preferred implementation of the first Ka-band synthesized upconverter 198. The I.F. signal energy from the first matrix output port $O_1$ is coupled to an input low-pass filter 260 by an input Ka-band isolator 262. The low-pass filter 260 is designed to pass the signal energy included within the selected I.F. spectral range. A first mixer buffer isolator 264 operatively connects the low-pass filter 260 with a mixer 268. The mixer 268 is buffered from the transmit antenna (not shown) by output isolator 290, bandpass filter 294, variable attenuator 298, and first and second output amplifiers 302 and 306.

The mixer 268 is driven by a local oscillator (L.O.) signal generated by a frequency synthesizer 272. As is indicated in FIG. 9, the synthesizer 272 is in communication with an L.O. port of the mixer 268 through an L.O. amplifier 276 and second mixer buffer isolator 280. The frequency synthesizer 272 may be tuned so as to provide a selected L.O. frequency in response to the periodic waveform generated by a reference oscillator 284. The oscillator 284 may be realized by a crystal oscillator or comparable tuned resonator.

In the implementation shown in FIG. 9 the matrix port $O_1$ produces an I.F. channel of 1.0 GHz, and the first Ka-band downlink channel (defined by filter 214) is set at 27 GHz. Hence, the synthesizer 272 would be initially adjusted to provide a 26 GHz L.O. signal. However, in order to maximize the flexibility of the inventive network 10 the synthesizer 272 will preferably be capable of supplying an L.O. signal to the mixer such that any I.F. channel may be converted to any Ka-band downlink channel. If it is again assumed that the I.F. spectral range extends from 1.0 to 1.5 GHz and the Ka-band downlink range from 27.0 to 27.5 GHz, then the L.O. signal is required to be varied between 25.5 GHz and 26.5 GHz. An appropriate range of frequencies for the frequency synthesizer 272 is thus seen to be 25.5 to 26.5 GHz. Since each of the synthesized upconverters within the downlink transmitter networks may be independently tuned, each synthesizer may use a common frequency reference 284. The use of a common frequency reference enhances signal coherency between downlink channels, thus simplifying testing and operation. Improved interchannel coherency simplifies receiver design and operation and improves communications channel performance.

Figure 10:
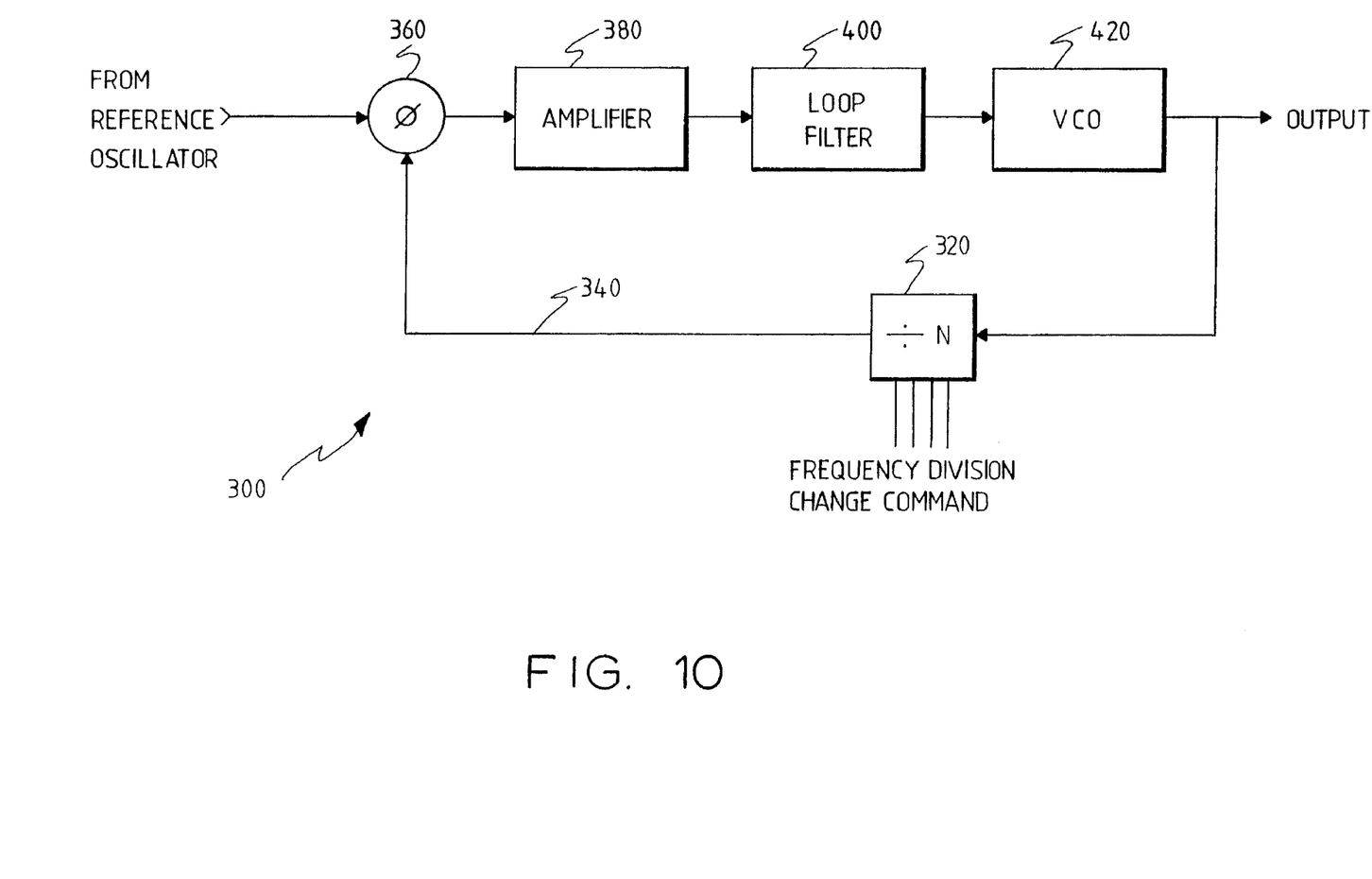
FIG. 10 illustrates a preferred implementation of a conventional frequency synthesizer.

The frequency synthesizers included within each upconverter of the inventive network 10 may be realized by, for example, a conventional phase-locked loop (PLL) 300 such as that shown in FIG. 10. One method of tuning a phase locked loop employed as a frequency synthesizer involves varying the value of a programmable divide-by-N circuit 320 disposed in a feedback path 340 of the PLL 300. Adjusting the value of N within the divide-by-N circuit 320 alters the frequency of the signal on feedback path 340 supplied to input phase/frequency detector 360. This frequency variation relative to a reference input to the detector 360 causes the detector 360 to produce an error voltage. The error voltage slews the frequency of voltage controlled oscillator (VCO) 420 to N multiples of the frequency of the reference input. When the reference input and feedback signal are of the same frequency the PLL 300 operates to track phase variation in the reference input.

Alternatively, each frequency synthesizer may be implemented using a direct digital synthesizer similar to those produced by, for example, Stanford Telecom of Santa Clara, Calif., Part No. STEL-1173. Utilization of direct digital synthesizers is preferred in embodiments of the present invention where operation in a time-division multiple access (TDMA) mode is contemplated. In TDMA operation users of two or more uplink channels are multiplexed in real time onto a single downlink channel. As may be appreciated by reference to FIGS. 4 and 8, TDMA operation requires real time switching of the switch matrix 126 and of the frequency synthesizer included within the upconverter associated with the multiplexed downlink channel. Direct digital synthesizers are favored in this regard as generally offering shorter switching and settling times than PLL's.

While the present invention has been described herein with reference to a particular embodiment, it is understood that the invention is not limited thereto. The teachings of this invention may be utilized by one having ordinary skill in the art to make modifications within the scope thereof. For example, the invention is not limited to the particular uplink and downlink frequency ranges mentioned herein. The inventive switching network routing architecture may be adapted to be operative over substantially any desired transmission bandwidth. The invention is similarly not limited to the specific hardware implementations given for the uplink receiver networks and for the downlink transmitter networks. Specifically, those skilled in the art may know of switching arrangements other than those employing four-port R-switches suitable for operatively coupling a redundant upconverter to the set of normally operative upconverters.

It is therefore contemplated by the appended claims to cover any and all such modifications.

Accordingly,

What is claimed is:

1. A switching apparatus having an improved routing architecture for converting input signals received over first and second uplink bands into output signals to be respectively carried over first and second downlink bands, said improved routing architecture comprising:

receiver means for converting said input signal within said first uplink band into a first set of I.F. signals spanning a first plurality of intermediate frequencies, and for converting said input signals within said second uplink band into a second set of I.F. signals spanning a second plurality of intermediate frequencies;

switch matrix means for routing said first and second sets of I.F. signals to a set of matrix output ports, said switch matrix having a first plurality of input ports for receiving said first set of I.F. signals and a second plurality of input ports for receiving said second set of I.F. signals; and synthesized transmitter means coupled to said matrix output ports for converting said first set of I.F. signals to said output signals within said first downlink band and for converting said second set of I.F. signals to said output signals carried over said second downlink band.

2. The switching apparatus of claim 1 wherein said transmitter means includes first and second transmitter networks, for generating said output signals within said first and second downlink frequency bands, respectively.

3. The switching apparatus of claim 2 wherein said first transmitter network includes:

first and second synthesized frequency converters, said first converter being tuned to synthesize a first output signal at a first output frequency within said first downlink band in response to signal energy at a first intermediate frequency and first R-switch means for operatively coupling said first synthesized converter to a first of said matrix output ports.

4. The switching apparatus of claim 3 wherein said first transmitter network further includes second R-switch means for operatively coupling said second synthesized converter to a second of said matrix output ports, said second converter being tuned to synthesize a second output signal at a second output frequency within said second downlink band in response to signal energy at a second intermediate frequency.

5. The switching apparatus of claim 4 wherein said first transmitter network includes a first multiplexing filter having a first passband encompassing said first output frequency and a second multiplexing filter having a second passband encompassing said second output frequency, said first and second filters being operatively connected to said first and second converters, respectively.

6. The switching apparatus of claim 5 wherein said receiver means includes first and second receiver networks, said first and second networks being disposed to generate said first and second sets of I.F. signals over said selected intermediate frequency range.

7. The switching apparatus of claim 6 wherein said first receiver network includes a first downconverter for translating the frequency of signal energy included within said first uplink band into signal energy within said selected intermediate frequency band.

8. The switching apparatus of claim 7 wherein said first receiver network includes a first filter array for dividing said translated signal energy from said first downconverter into said first set of I.F. signals.

9. The switching apparatus of claim 8 wherein said second receiver network includes a second downconverter for translating the frequency of signal energy included within said second uplink band into signal energy within said selected intermediate frequency band.

10. The switching apparatus of claim 9 wherein said second receiver network includes a second filter array for dividing said translated signal energy from said second downconverter into said second set of I.F. signals.

11. The switching apparatus of claim 10 wherein said first filter array includes a first filter having a passband encompassing a first intermediate frequency range within said selected intermediate frequency band, said first downconverter being tuned such that signal energy included within a first channel of said first uplink band is converted to signal energy within said first intermediate frequency range.

12. The switching apparatus of claim 10 wherein said second filter array includes a second filter having a passband encompassing said first intermediate frequency range, said second downconverter being tuned such that signal energy included within a first channel of said second uplink band is converted to signal energy within said first intermediate frequency range.

13. A switching apparatus having an improved routing architecture comprising:

receiver means for converting a set of input signals to a plurality of I.F. signals spanning a range of intermediate frequencies;

switch matrix means for routing said I.F. signals to first and second sets of matrix output ports;

a first set of synthesized frequency converters operatively coupled to said first set of matrix output ports, said first set of converters being tuned to synthesize a first set of output signals over a first downlink frequency band; and a second set of synthesized frequency converters operatively coupled to said second set of matrix output ports, said second set of converters being tuned to synthesize a second set of output signals over a second downlink frequency band.

14. The switching apparatus of claim 13 wherein said switching apparatus further includes:

first and second redundant synthesized frequency converters, a first R-switch network for operatively coupling said first redundant converter to said first set of converters, and a second R-switch network for operatively coupling said second redundant converter to said second set of converters.

15. The switching apparatus of claim 14 wherein said switch matrix means includes:

N input ports and M matrix output ports,

N power dividers, each of said power dividers being operatively coupled to one of said input ports, and M switch networks in communication with said N power dividers, each of said switch networks being operatively coupled to one of said matrix output ports.

16. The switching apparatus of claim 15 further including a first reference frequency source, said first frequency source being operatively coupled to each of said converters within said first set of frequency converters.

17. The switching apparatus of claim 16 wherein said first set of frequency converters includes first and second frequency converters, said first and second converters having first and second synthesizing multipliers for respectively generating first and second L.O. signals in response to said first frequency source.

18. The switching apparatus of claim 17 wherein said first and second frequency converters respectively include first and second mixers addressed by said first and second L.O. signals.

19. In a satellite communication system operative to switch input signal information received over a set of uplink channels to output signal information carried by a set of downlink channels, a switching apparatus having an improved routing architecture comprising:

receiver means for converting said received uplink signals into a plurality of I.F. signals spanning a range of intermediate frequencies;

switch matrix means for routing said I.F. signals to a set of matrix output ports; and synthesized transmitter means, said transmitter means having a plurality of feed ports in communication with said matrix output ports, for converting said I.F. signals into said output signal information.

* * * * *